Sept. 25, 1945.  S. G. HARWOOD  2,385,510
BALANCED VALVE
Filed Sept. 10, 1942
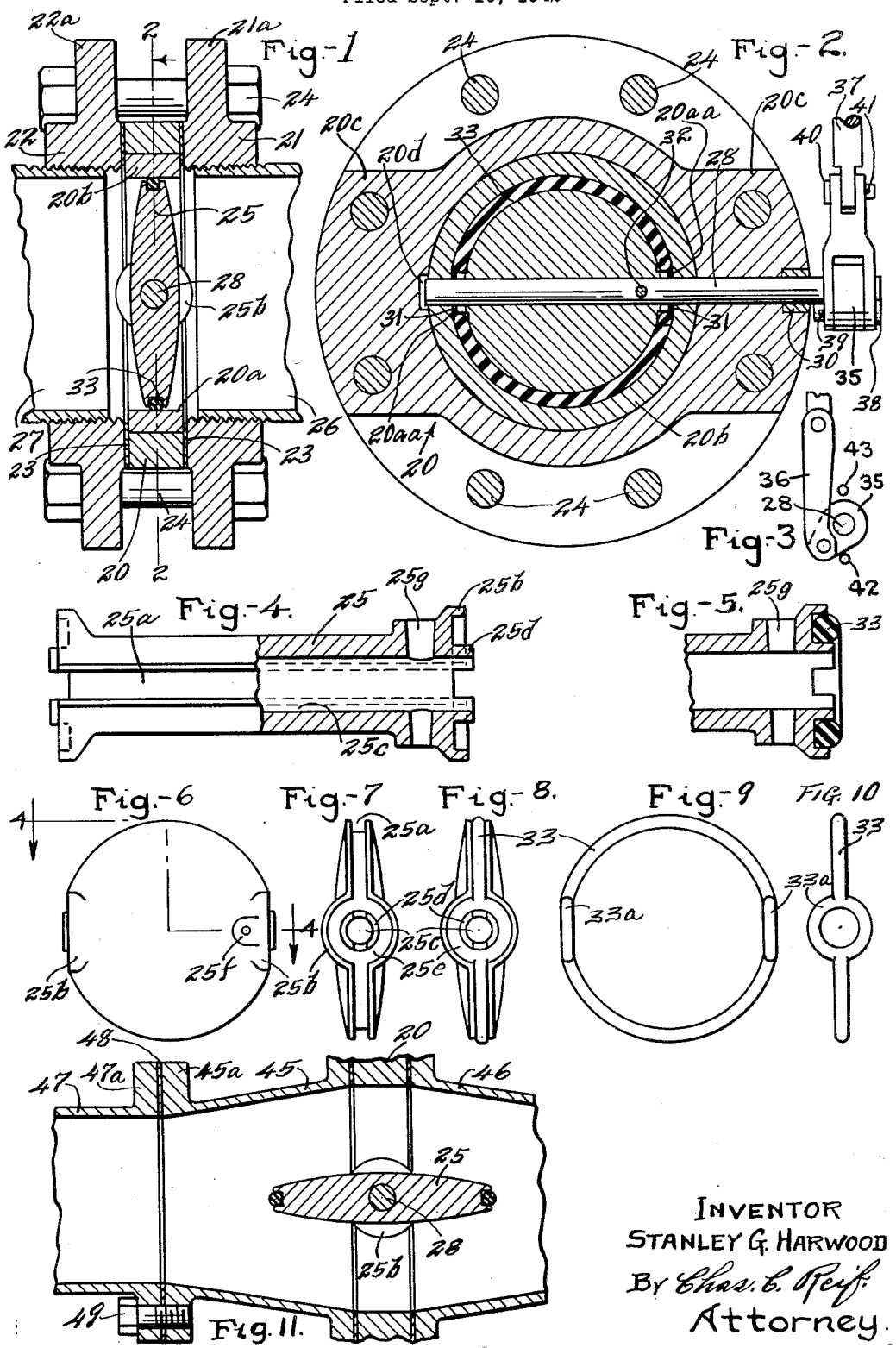
INVENTOR
STANLEY G. HARWOOD
By Chas. E. Reif.
Attorney.

Patented Sept. 25, 1945

2,385,510

UNITED STATES PATENT OFFICE 2,385,510

BALANCED VALVE

Stanley G. Harwood, San Marino, Calif.

Application September 10, 1942, Serial No. 457,829

5 Claims. (Cl. 251—11)

This invention relates to a valve, and particularly to a valve of the balanced type. While the valve might have various applications, it particularly is designed to be used in conduits containing liquids or liquids under pressure. The valve is designed to be used in place of valves of the well known check, globe, gate etc. types now commonly used and will be constructed and arranged for power or hand operation.

It is an object of this invention to provide a very simple and efficient valve which will be balanced by the fluid in the conduit to be controlled and which can easily be turned to open and closed position and which will effectively close said conduit.

It is a further object of the invention to provide a valve comprising a member having an interior substantially cylindrical wall, said wall preferably having flattened portions at opposite ends, a disk-like member within said wall and swingable about an axis perpendicular to the axis of said wall, and extending between said portions, said member having yielding means or a gasket extending about its periphery adapted to closely engage said wall and be somewhat compressed thereagainst to close said conduit.

It is another object of the invention to provide a valve structure which will be very compact and have small length longitudinally of the conduit to be controlled.

It is still another object of the invention to provide a valve of the balanced type comprising a member having an interior substantially cylindrical wall, a disk-like member disposed within said wall and carried on a shaft extending transversely of said member and journalled therein, the axis of said shaft passing through the center of said member, said disk-like member having a peripheral groove and an annular groove communicating therewith extending about said shaft together with a member of yielding or resilient material disposed in said grooves and adapted to engage said wall.

It is also an object of the invention to provide a valve as set forth in the preceding paragraph in which said wall has flattened portions at opposite sides and said disk-like member has two of said annular grooves with said member of yielding material disposed therein and engaging said flattened portions.

These and other objects and advantages of the invention will be fully set forth in the following description made in connection with the accompanying drawing in which like reference characters refer to similar parts throughout the several views and in which:

Fig. 1 is a vertical section taken through a valve embodying the invention;

Fig. 2 is a vertical section taken on line 2—2 of Fig. 1 as indicated by the arrow;

Fig. 3 is a view in side elevation of the operating connection for said valve;

Fig. 4 is a view partly in plan and partly in horizontal section of the movable valve member taken as indicated by line 4—4 of Fig. 6;

Fig. 5 is a partial view similar to Fig. 4 showing a gasket in place;

Fig. 6 is a view in side elevation of the movable valve member;

Fig. 7 is a view in side elevation as seen from the right of Fig. 6;

Fig. 8 is a view similar to Fig. 7 showing a gasket in place;

Fig. 9 is a view in side elevation of the gasket;

Fig. 10 is a view as seen from the right of Fig. 9; and

Fig. 11 is a view showing a different assembly construction for the valve.

Referring to the drawing a valve is shown comprising a valve body or member 20. Member 20 has an interior bore forming an interior wall 20a of general cylindrical form but preferably having flattened portions 20aa at opposite sides thereof. While said bore and wall could be formed directly in the valve body, in the embodiment of the invention illustrated it is shown as formed in a separate ring 20b which may be of different material from the valve body. The valve body could be of cast iron or steel and the ring 20b of harder steel, brass or bronze. Member 20 is shown as having flanges 20c extending at opposite sides thereof. Side members 21 and 22 are disposed at the opposite sides of member 20 and gaskets 23 are shown as disposed between the sides of member 20 and the adjacent sides of members 21 and 22. Said members will of course, be provided with flat gasket engaging surfaces. Members 21 and 22 are tightly connected to member 20 by the headed and nutted bolts 24 which are shown as equally and circumferentially spaced and extending through the flanges 20c and flanges 21a and 22a on the side members. Members 21 and 22 are shown as being bored and interiorly threaded and attached to the threaded adjacent ends of conduits 26 and 27. A comparatively thin or disk-like member 25 is provided disposed within the wall 20a and adapted to be oscillated about an axis extending perpendicular to and substantially intersecting the axis of said wall 20a. Member 25 is shown as carried on a shaft or pivot member 28, the ends of which project beyond member 25 and are journalled in opposite sides of member 20. The axis of shaft 28 passes through the center of member 25. A small recess 20d is shown at one side of member 20 into which the end of shaft 28 may project. A small bushing 30 is shown as fitted into one side of member 20 and about shaft 28. Comparatively thin washers 31 surround shaft 28 and are spaced between the disk-like member 25 and the wall of the valve body. Member 25 is provided with a peripheral groove 25a and said member is also shown as having bosses 25b at opposite sides thereof, the outer surfaces of which are flattened and provided with openings 25c through which shaft 28 extends. Said shaft is surrounded by a small hub 25d projecting from each of the bosses 25b. Member 25 is also provided with a circular groove 25e extending about the hub 25d, which groove 25e is of the same width as the groove 25a and communicates with the latter at each side. There is of course, a groove 25e in each of the bosses 25b. At one side of member 25 an additional boss 25f is formed at each side of boss 25b and a bore 25g extends through bosses 25f and member 25 as clearly shown in Figs. 4 and 5. Bore 25g receives a pin 32 for securing member 25 to shaft 28, said pin being illustrated as being tapered. A gasket 33 is provided constructed and arranged to extend about member 25 and be disposed in groove 25a, the same having circular or annular portions 33a at each side thereof arranged to be disposed in the grooves 25e. Said gasket will, as is customary, be made of yielding or resilient material and the same is shown as substantially circular in cross section.

While the member 25 may be turned by hand or by any suitable hand or power operated mechanism, in the embodiment of the invention illustrated shaft 28 is shown as having connected thereto an arm 35, the outer end of which is embraced by the bifurcated end of an arm 36. Arm 36 is bifurcated at its other end and is connected to an operating rod 37 which will in turn be connected to any suitable hand or power operated mechanism. Arm 35 is connected to arm 36 by a headed pin 38 held in place by a cotter pin 39 and arm 36 is connected to rod 37 by a headed pin 40 held in place by a cotter pin 41.

In operation the valve will be assembled as disposed as shown in Figs. 1 and 2. The rod 37 will be operated by any suitable mechanism and movement thereof will swing arm 36 which will in turn swing arm 35 to oscillate shaft 28. Shaft 28 will turn member 25 and when this member is turned to closed position as shown in Fig. 1, gasket 33 will closely and tightly engage the cylindrical wall 20a and effectively close the conduit controlled. Gasket 33 will be somewhat compressed or distorted against the wall 20a, thus insuring a very tight closure. Endwise movement of shaft 28 is prevented by washers 31 and the portions 33a of gasket 33 also closely engage the flattened portions of wall 20a effectively preventing any leakage of fluid along shaft 28, through the opening provided therefor or past member 25 at the ends of said shaft. If desired, stops 42 and 43 may be provided adapted to be engaged by arm 35 when the valve is in closed position as shown in Fig. 1 and when it is in position at right angles to said position or extending parallel to the axis of wall 20a and in fully open position.

In Fig. 11 member 20 is shown and the same is engaged at either side by connections 45 and 46. These have flanges similar to those on members 21 and 22 and will be connected to member 20 as shown in Fig. 1. At their other ends members 45 and 46 have flanges such as flanges 45a which will be connected to the flanges 47a on the ends of adjacent conduits 47. A gasket 48 is shown between flanges 45a and 47a and said flanges are shown as connected by the headed bolts 49.

From the above description it will be seen that I have provided a very simple and efficient structure of valve. The pressure of the fluid on either side of the axis of the conduit perfectly balances the valve at all times and this makes it possible to open or close it easily since the only resistance to turning the shaft is the friction on the bearings. In the common check valve and globe valve now used the pressure is unbalanced. In the check valve the unbalanced pressure of ordinary valves causes them to slam violently when the pressure in the line reverses its direction. In the globe valve it is necessary to use great force to close it against the full area of the valve nozzle. When a globe valve is hydraulically operated a piston or diaphragm of considerably larger area than the valve nozzle must be used to force the valve to closed position. In the present structure with the balanced valve the opening and closing is at all times effected with ease.

The present valve requires no large and expensive body but is in the nature of a spacer in the pipe or conduit itself. As clearly shown in the drawing, the length of the valve is comparatively small. With a four inch balanced valve such as disclosed herein the same can be made of a length of approximately one inch. In a similar sized valve of the globe type hydraulically operated the length is about 14 inches. Since the balanced valve is in the nature of a spacer in the pipe or conduit which it controls there is never any question about the strength of the valve body. The strength is greater than that of the pipe or conduit. The balanced valve as disclosed herewith can be quickly operated by hand whereas the opening and closing of a large globe or gate valve is a long and difficult operation. The valve is applicable to the smallest and largest sizes of conduits and will form a very satisfactory structure for a faucet. When used in pressure regulators or in relief or modulating valves the present structure will have a high degree of utility as it can be rotated so easily that a more sensitive control can be used.

It is obvious that the structure disclosed will have a high degree of utility for the purpose intended.

It will of course be understood that various changes may be made in the form, details, arrangement and proportions of the parts, without departing from the scope of applicant's invention, which generally stated, consists in a device capable of carrying out the objects above set forth, in the parts and combination of parts disclosed and defined in the appended claims.

What is claimed is:

1. A valve for conduits adapted to contain liquids comprising a member having an interior wall of general cylindrical form, a disk-like member disposed in said member and oscillatable about an axis extending perpendicular to the axis of said wall, a pivot means disposed at opposite points of the periphery of said disk-like member, said disk-like member having portions at diametrically opposite points on its periphery respectively having openings therein for receiving said pivot means, said portions having circular grooves about said openings and encircling said pivot means and said disk-like member having a groove extending about its periphery communicating with said circular grooves and a member of yielding material fitting in said grooves and extending about said disk-like member for 360 degrees and adapted to engage said wall throughout 360 degrees whereby a tight seal is formed about said disk-like member for 360 degrees and a seal is formed about said pivot means throughout 360 degrees.

2. A valve for a conduit adapted to contain liquid comprising a member having an interior wall of general cylindrical form having portions at diametrically opposite portions thereof in flat planes, a disk-like valve member disposed in said member and oscillatable about an axis extending perpendicular to the axis of said cylindrical wall, a pivot means extending centrally of said disk-like member and extending between said flat portions of said wall, said disk-like member having portions at diametrically opposite portions respectively having openings therein for receiving said pivot means, said portions having circular grooves about said openings encircling said pivot means and said disk-like member having a groove extending about the periphery thereof communicating with said circular grooves and a member of yielding material fitting in said circular grooves and said last mentioned groove for engaging said wall, the portion of said member in said circular grooves engaging said flat portions of said wall and forming a seal entirely around said pivot means.

3. A valve for a conduit adapted to contain liquid comprising a member having an interior wall of general cylindrical form except for portions in flat planes at diametrically opposite portions thereof, a disk-like valve member disposed within said wall and oscillatable about an axis perpendicular to the axis thereof, a shaft for oscillating said member, said disk-like member disposed equally at opposite sides of said shaft and having a groove extending about the periphery thereof, the same also having grooves at diametrically opposite peripheral portions thereof extending about said shaft and communicating with said first mentioned groove and a gasket fitting in all of said grooves adapted to engage said wall with said valve in closed position.

4. A valve for a conduit adapted to contain liquid comprising a member having an interior wall of general cylindrical form but having flat portions at diametrically opposite portions thereof, a disk-like valve member disposed within said wall, a shaft for turning said disk-like member, said disk-like member being disposed equally at opposite sides of said shaft, said shaft and disk-like member turning about an axis extending perpendicular to the axis of said wall and through said flat portions, two ring-like gaskets carried at diametrically opposite peripheral portions of said disk-like valve member encircling said shaft and adapted to have complete engagement with said flat portions of said wall and form a seal about said shaft throughout 360 degrees and a gasket extending about the periphery of said valve member forming a continuation of said gaskets and adapted to be wedged into engagement with the cylindrical part of said wall to close said valve, said valve adapted to be rotated through 90 degrees from its closed position to move said last mentioned gasket away from said wall to open said valve.

5. A valve for conduits adapted to contain liquids comprising a member having an interior wall of general cylindrical form, a disk-like member disposed within said wall, a shaft for turning said disk-like member, said shaft and member turning about an axis perpendicular to the axis of said wall, yielding means extending about the periphery of said disk-like member, means on said shaft preventing longitudinal movement thereof, said shaft extending to the outer side of said first mentioned member, means connected to said shaft for turning the same and oscillating said valve member, said wall having flat portions at diametrically opposite portions thereof through which said shaft passes and yielding means surrounding said shaft and adapted to engage said flat portions of said wall in cooperation with said resilient means.

STANLEY G. HARWOOD.